United States Patent
Hanley et al.

(10) Patent No.: US 9,452,391 B1
(45) Date of Patent: Sep. 27, 2016

(54) COMPOSITE POLYAMIDE MEMBRANE TREATED WITH DIHYROXYARYL COMPOUNDS AND NITROUS ACID

(71) Applicant: Dow Global Technologies LLC, Midland, MI (US)

(72) Inventors: Patrick S. Hanley, Midland, MI (US); Mou Paul, Edina, MN (US); Abhishek Roy, Edina, MN (US); Ian A. Tomlinson, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 15/030,506

(22) PCT Filed: Oct. 29, 2014

(86) PCT No.: PCT/US2014/062836
§ 371 (c)(1),
(2) Date: Apr. 19, 2016

(87) PCT Pub. No.: WO2015/084512
PCT Pub. Date: Jun. 11, 2015

Related U.S. Application Data

(60) Provisional application No. 61/910,557, filed on Dec. 2, 2013.

(51) Int. Cl.
*B01D 69/12* (2006.01)
*B01D 71/56* (2006.01)
*B01D 69/10* (2006.01)
*B01D 67/00* (2006.01)

(52) U.S. Cl.
CPC ......... *B01D 69/125* (2013.01); *B01D 67/0006* (2013.01); *B01D 67/0095* (2013.01); *B01D 67/0097* (2013.01); *B01D 69/105* (2013.01); *B01D 71/56* (2013.01); *B01D 2323/30* (2013.01); *B01D 2323/40* (2013.01)

(58) Field of Classification Search
CPC ............ B01D 69/125; B01D 67/0093; B01D 67/0006; B01D 71/56
See application file for complete search history.

(56) References Cited

U.S. PATENT DOCUMENTS

| | | | |
|---|---|---|---|
| 3,304,310 A | 2/1967 | Hari et al. | |
| 3,686,116 A | 8/1972 | Rio | |
| 3,694,390 A | 9/1972 | Winslow | |
| 3,878,109 A | 4/1975 | Ikeda et al. | |
| 4,259,183 A | 3/1981 | Cadotte | |
| 4,265,745 A | 5/1981 | Kawaguchi et al. | |
| 4,277,344 A | 7/1981 | Cadotte | |
| 4,529,646 A | 7/1985 | Sundet | |
| 4,606,943 A | 8/1986 | Rak et al. | |
| 4,626,468 A | 12/1986 | Sundet | |
| 4,643,829 A | 2/1987 | Sundet | |
| 4,719,062 A | 1/1988 | Sundet | |
| 4,758,343 A | 7/1988 | Sasaki et al. | |
| 4,761,234 A | 8/1988 | Uemura et al. | |
| 4,769,148 A | 9/1988 | Fibiger et al. | |
| 4,783,346 A | 11/1988 | Sundet | |
| 4,812,270 A | 3/1989 | Cadotte et al. | |
| 4,830,885 A | 5/1989 | Tran et al. | |
| 4,872,984 A | 10/1989 | Tomaschke | |
| 4,888,116 A | 12/1989 | Cadotte et al. | |
| 4,948,507 A | 8/1990 | Tomaschke | |
| 4,950,404 A | 8/1990 | Chau | |
| 4,960,517 A | 10/1990 | Cadotte | |
| 5,015,380 A | 5/1991 | Sundet | |
| 5,015,382 A | 5/1991 | Sundet | |
| 5,019,264 A | 5/1991 | Arthur | |
| 5,049,282 A | 9/1991 | Linder et al. | |
| 5,051,178 A | 9/1991 | Uemura et al. | |
| 5,160,619 A | 11/1992 | Yamaguchi et al. | |

(Continued)

FOREIGN PATENT DOCUMENTS

| CN | 1035338 | 9/1989 |
|---|---|---|
| CN | 1935338 | 3/2007 |

(Continued)

OTHER PUBLICATIONS

Li et al, Polyamide Thin Film Composite Membranes Prepared from Isomeric Biphenyl Tetraacyl Chloride and m-phenylenediamine, Journal of Membrane Science 315, (2008) 20-27.

(Continued)

*Primary Examiner* — Alex A Rolland

(57) ABSTRACT

A method for making a composite polyamide membrane comprising a porous support and a polyamide layer, including the steps of: i) applying a polar solution including a polyfunctional amine monomer and a non-polar solution including a polyfunctional acyl halide monomer to a surface of a porous support and interfacially polymerizing the monomers to form a polyamide layer; ii) applying a dihydroxyaryl compound to the polyamide layer, wherein the dihydroxyaryl compound is represented by: formula wherein D, D', D" and D'" are independently selected from: alkyl, alkoxy, hydrogen, halogen, hydroxyl and amine, and L is a linking group; and iii) exposing the thin film polyamide layer to nitrous acid.

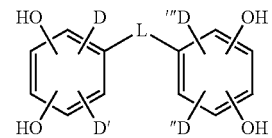

10 Claims, No Drawings

(56) References Cited

U.S. PATENT DOCUMENTS

| | | |
|---|---|---|
| 5,180,802 A | 1/1993 | Hartman et al. |
| 5,246,587 A | 9/1993 | Tomaschke |
| 5,254,261 A | 10/1993 | Tomaschke et al. |
| 5,290,452 A | 3/1994 | Schucker |
| 5,336,409 A | 8/1994 | Hachisuka et al. |
| 5,510,527 A | 4/1996 | Hachisuka et al. |
| 5,576,057 A | 11/1996 | Hirose et al. |
| 5,582,725 A | 12/1996 | McCray et al. |
| 5,593,588 A | 1/1997 | Kim et al. |
| 5,614,099 A | 3/1997 | Hirose et al. |
| 5,616,249 A | 4/1997 | Hodgdon |
| 5,693,227 A | 12/1997 | Costa |
| 5,733,602 A | 3/1998 | Hirose et al. |
| 5,744,039 A | 4/1998 | Itoh et al. |
| 5,783,079 A | 7/1998 | Kumano et al. |
| 5,843,351 A | 12/1998 | Hirose et al. |
| 5,876,602 A | 3/1999 | Jons et al. |
| 5,989,426 A | 11/1999 | Hirose et al. |
| 6,024,873 A | 2/2000 | Hirose et al. |
| 6,086,764 A | 7/2000 | Linder et al. |
| 6,162,358 A | 12/2000 | Li et al. |
| 6,245,234 B1 | 6/2001 | Koo et al. |
| 6,280,853 B1 | 8/2001 | Mickols |
| 6,337,018 B1 | 1/2002 | Mickols |
| 6,406,626 B1 | 6/2002 | Murakami et al. |
| 6,464,873 B1 | 10/2002 | Tomaschke |
| 6,521,130 B1 | 2/2003 | Kono et al. |
| 6,562,266 B2 | 5/2003 | Mickols |
| 6,723,241 B2 | 4/2004 | Mickols |
| 6,723,422 B1 | 4/2004 | Hirose et al. |
| 6,777,488 B1 | 8/2004 | Araki et al. |
| 6,878,278 B2 | 4/2005 | Mickols |
| 7,279,097 B2 | 10/2007 | Tomioka et al. |
| 7,806,275 B2 | 10/2010 | Murphy et al. |
| 7,815,987 B2 | 10/2010 | Mickols et al. |
| 8,147,735 B2 | 4/2012 | Buschmann |
| 8,177,978 B2 | 5/2012 | Kurth et al. |
| 8,567,612 B2 | 10/2013 | Kurth et al. |
| 8,603,340 B2 | 12/2013 | Kurth et al. |
| 8,968,828 B2 | 3/2015 | Roy et al. |
| 8,999,449 B2 | 4/2015 | Paul et al. |
| 9,073,015 B2 | 7/2015 | Rosenberg et al. |
| 2008/0185332 A1 | 8/2008 | Niu et al. |
| 2009/0071903 A1 | 3/2009 | Nakatsuji et al. |
| 2009/0107922 A1 | 4/2009 | Zhang et al. |
| 2009/0220690 A1 | 9/2009 | Niu et al. |
| 2009/0272692 A1 | 11/2009 | Kurth et al. |
| 2010/0062156 A1 | 3/2010 | Kurth et al. |
| 2011/0005997 A1 | 1/2011 | Kurth et al. |
| 2011/0049055 A1 | 3/2011 | Wang et al. |
| 2012/0003387 A1 | 1/2012 | Kim et al. |
| 2012/0080058 A1 | 4/2012 | Isaias et al. |
| 2012/0248027 A1 | 10/2012 | Sasaki et al. |
| 2012/0261332 A1 | 10/2012 | Takagi et al. |
| 2012/0261344 A1 | 10/2012 | Kurth et al. |
| 2012/0305473 A1 | 12/2012 | Ogawa et al. |
| 2013/0089727 A1 | 4/2013 | Nilsen et al. |
| 2013/0126419 A1 | 5/2013 | Ogawa et al. |
| 2013/0256215 A1 | 10/2013 | Nakatsuji et al. |
| 2013/0287944 A1 | 10/2013 | Paul et al. |
| 2013/0287946 A1 | 10/2013 | Jons et al. |
| 2014/0170314 A1 | 6/2014 | Zhang et al. |
| 2014/0199483 A1 | 7/2014 | Roy et al. |
| 2014/0206900 A1 | 7/2014 | Qiu et al. |
| 2014/0231338 A1 | 8/2014 | Takaya et al. |
| 2014/0264161 A1 | 9/2014 | Roy et al. |
| 2014/0264162 A1 | 9/2014 | Qiu et al. |
| 2014/0272134 A1 | 9/2014 | Roy et al. |
| 2014/0370191 A1 | 12/2014 | Rosenberg et al. |
| 2015/0129485 A1 | 5/2015 | Roy et al. |
| 2015/0147470 A1 | 5/2015 | Arrowood et al. |
| 2015/0151255 A1 | 6/2015 | Roy et al. |
| 2015/0157990 A1 | 6/2015 | Roy et al. |
| 2015/0165387 A1 | 6/2015 | Roy et al. |
| 2015/0174534 A1 | 6/2015 | Paul et al. |
| 2015/0298066 A1* | 10/2015 | Roy ............... B01D 71/56 427/245 |
| 2015/0306548 A1 | 10/2015 | Roy et al. |
| 2015/0314243 A1 | 11/2015 | Roy et al. |

FOREIGN PATENT DOCUMENTS

| | | |
|---|---|---|
| CN | 102219673 | 10/2011 |
| EP | 556569 | 11/1993 |
| WO | 2013048762 | 4/2013 |
| WO | 2013048763 | 4/2013 |
| WO | 2013048765 | 4/2013 |
| WO | 2015084511 | 6/2015 |
| WO | 2015105630 | 7/2015 |
| WO | 2015105631 | 7/2015 |
| WO | 2015105632 | 7/2015 |
| WO | 2015105636 | 7/2015 |
| WO | 2015105637 | 7/2015 |
| WO | 2015105638 | 7/2015 |
| WO | 2015105639 | 7/2015 |
| WO | 2015167759 | 11/2015 |
| WO | 2015175254 | 11/2015 |
| WO | 2015175256 | 11/2015 |
| WO | 2015175258 | 11/2015 |

OTHER PUBLICATIONS

Petersen, Composite Reverse Osmosis and Nanofiltration Membranes, Journal of Membrane Science 83, (1993) 81-150.

Quercetin, 2005, XP002734455.

* cited by examiner

COMPOSITE POLYAMIDE MEMBRANE TREATED WITH DIHYROXYARYL COMPOUNDS AND NITROUS ACID

FIELD

The present invention is generally directed toward composite polyamide membranes along with methods for making and using the same.

INTRODUCTION

Composite polyamide membranes are used in a variety of fluid separations. One common class of membranes includes a porous support coated with a "thin film" polyamide layer. The thin film layer may be formed by an interfacial polycondensation reaction between polyfunctional amine (e.g. m-phenylenediamine) and polyfunctional acyl halide (e.g. trimesoyl chloride) monomers which are sequentially coated upon the support from immiscible solutions, see for example U.S. Pat. No. 4,277,344 to Cadotte. Various constituents may be added to one or both of the coating solutions to improve membrane performance. For example, U.S. Pat. No. 4,888,116 to Cadotte describes the use of combinations of bi- and tri-functional acyl halide monomers, e.g. isophthaloyl chloride or terephthaloyl chloride with trimesoyl chloride. The resulting polyamide layer is subsequently treated with a reagent (nitrous acid) to form diazonium salt groups and corresponding derivatives (e.g. azo linkages). See also WO 2013/047398, US2013/0256215, US2013/0126419, US2012/0305473, US2012/0261332 and US2012/0248027. U.S. Pat. No. 6,878,278 to Mickols describes the addition of a wide range of additives to one or both coating solutions including various tri-hydrocarbyl phosphate compounds. WO2012/102942, WO2012/102943, WO2012/102944, WO2013/048765 and WO2013/103666 describe the addition of various monomers that include both carboxylic acid and amine-reactive functional groups in combination with various tri-hydrocarbyl phosphate compounds. The search continues for new combinations of monomers, additives and post-treatments that further improve membrane performance.

SUMMARY

The invention includes a method for making a composite polyamide membrane including a porous support and a thin film polyamide layer. The method includes the steps of: i) applying a polar solution including a polyfunctional amine monomer and a non-polar solution including a polyfunctional acyl halide monomer to a surface of a porous support and interfacially polymerizing the monomers to form a polyamide layer, ii) applying a dihydroxyaryl compound to the polyamide layer, wherein the dihydroxyaryl compound is represented by Formula V,

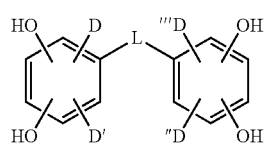

Formula (V)

wherein D, D', D" and D'" are independently selected from: alkyl, alkoxy, hydrogen, halogen, hydroxyl and amine, and L is a linking group; and iii) exposing the thin film polyamide layer to nitrous acid. Step ii) may be performed before, during or after step iii). Many additional embodiments are described.

DETAILED DESCRIPTION

The invention is not particularly limited to a specific type, construction or shape of membrane or application. For example, the present invention is applicable to flat sheet, tubular and hollow fiber polyamide membranes useful in a variety of applications including forward osmosis (FO), reverse osmosis (RO), nano filtration (NF), ultra filtration (UF), micro filtration (MF) and pressure retarded fluid separations. However, the invention is particularly useful in the preparation of asymmetric membranes designed for RO and NF separations. RO membranes are relatively impermeable to virtually all dissolved salts and typically reject more than about 95% of salts having monovalent ions such as sodium chloride. RO composite membranes also typically reject more than about 95% of inorganic molecules as well as organic molecules with molecular weights greater than approximately 100 AMU (Daltons). NF membranes are more permeable than RO membranes and typically reject less than about 95% of salts having monovalent ions while rejecting more than about 50% (and often more than 90%) of salts having divalent ions—depending upon the species of divalent ion. NF membranes also typically reject particles in the nanometer range as well as organic molecules having molecular weights greater than approximately 200 to 500 AMU.

Examples of composite polyamide membranes include FilmTec Corporation FT-30TH type membranes, i.e. a flat sheet composite membrane comprising a bottom layer (back side) of a nonwoven backing web (e.g. PET scrim), a middle layer of a porous support having a typical thickness of about 25-125 μm and top layer (front side) comprising a thin film polyamide layer having a thickness typically less than about 1 micron, e.g. from 0.01 micron to 1 micron but more commonly from about 0.01 to 0.1 μm. The porous support is typically a polymeric material having pore sizes which are of sufficient size to permit essentially unrestricted passage of permeate but not large enough so as to interfere with the bridging over of a thin film polyamide layer formed thereon. For example, the pore size of the support preferably ranges from about 0.001 to 0.5 μm. Non-limiting examples of porous supports include those made of: polysulfone, polyether sulfone, polyimide, polyamide, polyetherimide, polyacrylonitrile, poly(methyl methacrylate), polyethylene, polypropylene, and various halogenated polymers such as polyvinylidene fluoride. For RO and NF applications, the porous support provides strength but offers little resistance to fluid flow due to its relatively high porosity.

Due to its relative thinness, the polyamide layer is often described in terms of its coating coverage or loading upon the porous support, e.g. from about 2 to 5000 mg of polyamide per square meter surface area of porous support and more preferably from about 50 to 500 mg/m². The polyamide layer is preferably prepared by an interfacial polycondensation reaction between a polyfunctional amine monomer and a polyfunctional acyl halide monomer upon the surface of the porous support as described in U.S. Pat. No. 4,277,344 and U.S. Pat. No. 6,878,278. More specifically, the polyamide membrane layer may be prepared by interfacially polymerizing a polyfunctional amine monomer with a polyfunctional acyl halide monomer, (wherein each term is intended to refer both to the use of a single species or multiple species), on at least one surface of a porous support. As used herein, the term "polyamide" refers to a polymer in which amide linkages (—C(O)NH—) occur along the molecular chain. The polyfunctional amine and polyfunctional acyl halide monomers are most commonly applied to the porous support by way of a coating step from solution, wherein the polyfunctional amine monomer is typically coated from an aqueous-based or polar solution and the polyfunctional acyl halide from an organic-based or non-polar solution. Although the coating steps need not follow a specific order, the polyfunctional amine monomer is preferably first coated on the porous support followed by the polyfunctional acyl halide. Coating can be accomplished by spraying, film coating, rolling, or through the use of a dip tank among other coating techniques. Excess solution may be removed from the support by air knife, dryers, ovens and the like.

The polyfunctional amine monomer comprises at least two primary amine groups and may be aromatic (e.g., m-phenylenediamine (mPD), p-phenylenediamine, 1,3,5-triaminobenzene, 1,3,4-triaminobenzene, 3,5-diaminobenzoic acid, 2,4-diaminotoluene, 2,4-diaminoanisole, and xylylenediamine) or aliphatic (e.g., ethylenediamine, propylenediamine, cyclohexane-1,3-diamine and tris (2-diaminoethyl) amine). One particularly preferred polyfunctional amine is m-phenylene diamine (mPD). The polyfunctional amine monomer may be applied to the porous support as a polar solution. The polar solution may contain from about 0.1 to about 10 wt % and more preferably from about 1 to about 6 wt % polyfunctional amine monomer. In one set of embodiments, the polar solutions includes at least 2.5 wt % (e.g. 2.5 to 6 wt %) of the polyfunctional amine monomer. Once coated on the porous support, excess solution may be optionally removed.

The polyfunctional acyl halide monomer comprises at least two acyl halide groups and preferably no carboxylic acid functional groups and may be coated from a non-polar solvent although the polyfunctional acyl halide may be alternatively delivered from a vapor phase (e.g., for polyfunctional acyl halides having sufficient vapor pressure). The polyfunctional acyl halide is not particularly limited and aromatic or alicyclic polyfunctional acyl halides can be used along with combinations thereof. Non-limiting examples of aromatic polyfunctional acyl halides include: trimesic acyl chloride, terephthalic acyl chloride, isophthalic acyl chloride, biphenyl dicarboxylic acyl chloride, and naphthalene dicarboxylic acid dichloride. Non-limiting examples of alicyclic polyfunctional acyl halides include: cyclopropane tri carboxylic acyl chloride, cyclobutane tetra carboxylic acyl chloride, cyclopentane tri carboxylic acyl chloride, cyclopentane tetra carboxylic acyl chloride, cyclohexane tri carboxylic acyl chloride, tetrahydrofuran tetra carboxylic acyl chloride, cyclopentane dicarboxylic acyl chloride, cyclobutane dicarboxylic acyl chloride, cyclohexane dicarboxylic acyl chloride, and tetrahydrofuran dicarboxylic acyl chloride. One preferred polyfunctional acyl halide is trimesoyl chloride (TMC). The polyfunctional acyl halide may be dissolved in a non-polar solvent in a range from about 0.01 to 10 wt %, preferably 0.05 to 3% wt % and may be delivered as part of a continuous coating operation. In one set of embodiments wherein the polyfunctional amine monomer concentration is less than 3 wt %, the polyfunctional acyl halide is less than 0.3 wt %.

Suitable non-polar solvents are those which are capable of dissolving the polyfunctional acyl halide and which are immiscible with water; e.g. paraffins (e.g. hexane, cyclohexane, heptane, octane, dodecane), isoparaffins (e.g. ISOPAR™ L), aromatics (e.g. Solvesso™ aromatic fluids, Varsol™ non-dearomatized fluids, benzene, alkylated benzene (e.g. toluene, xylene, trimethylbenzene isomers, diethylbenzene)) and halogenated hydrocarbons (e.g. FREON™ series, chlorobenzene, di and trichlorobenzene) or mixtures thereof. Preferred solvents include those which pose little threat to the ozone layer and which are sufficiently safe in terms of flashpoints and flammability to undergo routine processing without taking special precautions. A preferred solvent is ISOPAR™ available from Exxon Chemical Company.

The non-polar solution may include additional constituents including co-solvents, phase transfer agents, solubilizing agents, complexing agents and acid scavengers wherein individual additives may serve multiple functions. Representative co-solvents include: benzene, toluene, xylene, mesitylene, ethyl benzene-diethylene glycol dimethyl ether, cyclohexanone, ethyl acetate, butyl Carbitol™ acetate, methyl laurate and acetone. A representative acid scavenger includes N, N-diisopropylethylamine (DIEA). The non-polar solution may also include small quantities of water or other polar additives but preferably at a concentration below their solubility limit in the non-polar solution.

One or both of the polar and non-polar coating solutions may additional include tri-hydrocarbyl phosphate compounds as represented by Formula I:

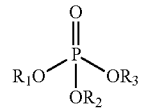

Formula (I)

wherein "P" is phosphorous, "O" is oxygen and $R_1$, $R_2$ and $R_3$ are independently selected from hydrogen and hydrocarbyl groups comprising from 1 to 10 carbon atoms, with the proviso that no more than one of $R_1$, $R_2$ and $R_3$ are hydrogen. $R_1$, $R_2$ and $R_3$ are preferably independently selected from aliphatic and aromatic groups. Applicable aliphatic groups include both branched and unbranched species, e.g. methyl, ethyl, propyl, isopropyl, butyl, isobutyl, pentyl, 2-pentyl, 3-pentyl. Applicable cyclic groups include cyclopentyl and cyclohexyl. Applicable aromatic groups include phenyl and naphthyl groups. Cyclo and aromatic groups may be linked to the phosphorous atom by way of an aliphatic linking group, e.g., methyl, ethyl, etc. The aforementioned aliphatic and aromatic groups may be unsubstituted or substituted (e.g., substituted with methyl, ethyl, propyl, hydroxyl, amide, ether, sulfone, carbonyl, ester, cyanide, nitrile, isocyanate, urethane, beta-hydroxy ester, etc); however, unsubstituted alkyl groups having from 3 to 10 carbon atoms are preferred. Specific examples of tri-hydrocarbyl phosphate compounds include: tripropyl phosphate, tributyl phosphate, tripentyl phosphate, trihexyl phosphate, triphenyl phosphate, propyl biphenyl phosphate, dibutyl phenyl phosphate, butyl diethyl phosphate, dibutyl hydrogen phosphate, butyl heptyl hydrogen phosphate and butyl heptyl hexyl phosphate. The species selected should be at least partially soluble in the solution from which it is coated, i.e. polar versus non-polar coating solution. Additional examples are as such compounds are described in U.S. Pat. No. 6,878,278, U.S. Pat. No. 6,723,241, U.S. Pat. No. 6,562,266 and U.S. Pat. No. 6,337,018.

In one preferred embodiment, the non-polar solution may include from 0.001 to 10 wt % and more preferably from 0.01 to 1 wt % of the tri-hydrocarbyl phosphate compound.

In another embodiment, the non-polar solution includes the tri-hydrocarbyl phosphate compound in a molar (stoichiometric) ratio of 1:5 to 5:1 and more preferably 1:1 to 3:1 with the polyfunctional acyl halide monomer.

In another preferred embodiment, the non-polar solution may include an acid-containing monomer comprising a $C_2$-$C_{20}$ hydrocarbon moiety substituted with at least one carboxylic acid functional group or salt thereof and at least one amine-reactive functional group selected from: acyl halide, sulfonyl halide and anhydride, wherein the acid-containing monomer is distinct from the polyfunctional acyl halide monomer. In one sub-set of embodiments, the acid-containing monomer comprises an arene moiety. Non-limiting examples include mono and di-hydrolyzed counterparts of the aforementioned polyfunctional acyl halide monomers including two to three acyl halide groups and mono, di and tri-hydrolyzed counterparts of the polyfunctional halide monomers that include at least four amine-reactive moieties. A preferred species includes 3,5-bis(chlorocarbonyl)benzoic acid (i.e. mono-hydrolyzed trimesoyl chloride or "mhTMC"). Additional examples of monomers are described in WO 2012/102942 and WO 2012/102943 (see Formula III wherein the amine-reactive groups ("Z") are selected from acyl halide, sulfonyl halide and anhydride). Specific species including an arene moiety and a single amine-reactive group include: 3-carboxylbenzoyl chloride, 4-carboxylbenzoyl chloride, 4-carboxy phthalic anhydride and 5-carboxy phthalic anhydride, and salts thereof. Additional examples are represented by Formula II:

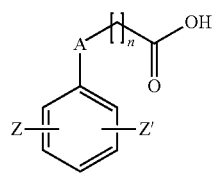

Formula (II)

wherein A is selected from: oxygen (e.g. —O—); amino (—N(R)—) wherein R is selected from a hydrocarbon group having from 1 to 6 carbon atoms, e.g. aryl, cycloalkyl, alkyl—substituted or unsubstituted but preferably alkyl having from 1 to 3 carbon atoms with or without substituents such as halogen and carboxyl groups); amide (—C(O)N(R)—) with either the carbon or nitrogen connected to the aromatic ring and wherein R is as previously defined; carbonyl (—C(O)—); sulfonyl (—SO$_2$—); or is not present (e.g. as represented in Formula III); n is an integer from 1 to 6, or the entire group is an aryl group; Z is an amine reactive functional group selected from: acyl halide, sulfonyl halide and anhydride (preferably acyl halide); Z' is selected from the functional groups described by Z along with hydrogen and carboxylic acid. Z and Z' may be independently positioned meta or ortho to the A substituent on the ring. In one set of embodiments, n is 1 or 2. In yet another set of embodiments, both Z and Z' are both the same (e.g. both acyl halide groups). In another set of embodiments, A is selected from alkyl and alkoxy groups having from 1 to 3 carbon atoms. Non-limiting representative species include: 2-(3,5-bis(chlorocarbonyl)phenoxy)acetic acid, 3-(3,5-bis(chlorocarbonyl)phenyl) propanoic acid, 2-((1,3-dioxo-1,3-dihydroisobenzofuran-5-yl)oxy)acetic acid, 3-(1,3-dioxo-1,3-dihydroisobenzofuran-5-yl)propanoic acid, 2-(3-(chlorocarbonyl) phenoxy)acetic acid, 3-(3-(chlorocarbonyl)phenyl)propanoic acid, 3-((3,5bis(chlorocarbonyl)phenyl) sulfonyl) propanoic acid, 3-((3-(chlorocarbonyl)phenyl)sulfonyl)propanoic acid, 3-((1,3-dioxo-1,3-dihydroisobenzofuran-5-yl)sulfonyl)propanoic acid, 3-((1,3-dioxo-1,3-dihydroisobenzofuran-5-yl)amino) propanoic acid, 3-((1,3-dioxo-1,3-dihydroisobenzofuran-5-yl)(ethyl)amino)propanoic acid, 3-((3,5-bis(chlorocarbonyl)phenyl)amino) propanoic acid, 3-((3,5-bis(chlorocarbonyl)phenyl)(ethyl)amino) propanoic acid, 4-(4-(chlorocarbonyl)phenyl)-4-oxobutanoic acid, 4-(3,5-bis(chlorocarbonyl)phenyl)-4-oxobutanoic acid, 4-(1,3-dioxo-1,3-dihydroisobenzofuran-5-yl)-4-oxobutanoic acid, 2-(3,5-bis(chlorocarbonyl)phenyl)acetic acid, 2-(2,4-bis(chlorocarbonyl)phenoxy) acetic acid, 4-((3,5-bis(chlorocarbonyl) phenyl)amino)-4-oxobutanoic acid, 2-((3,5-bis(chloro carbonyl)phenyl)amino)acetic acid, 2-(N-(3,5-bis(chlorocarbonyl)phenyl) acetamido)acetic acid, 2,2'-((3,5-bis(chlorocarbonyl) phenylazanediyl) diacetic acid, N-[(1,3-dihydro-1,3-dioxo-5-isobenzofuranyl)carbonyl]-glycine, 4-[[(1,3-dihydro-1,3-dioxo-5-isobenzofuranyl)carbonyl]amino]-benzoic acid, 1,3-dihydro-1,3-dioxo-4-isobenzofuran propanoic acid, 5-[[(1,3-dihydro-1,3-dioxo-5-isobenzofuranyl)carbonyl] amino]-1,3-benzenedicarboxylic acid and 3-[(1,3-dihydro-1,3-dioxo-5-isobenzofuranyl)sulfonyl]-benzoic acid. Another embodiment is represented by Formula III.

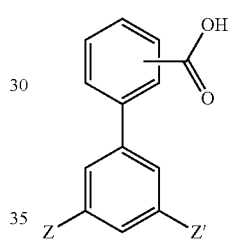

Formula (III)

wherein the carboxylic acid group may be located meta, para or ortho upon the phenyl ring.

Representative examples where the hydrocarbon moiety is an aliphatic group are represented by Formula IV:

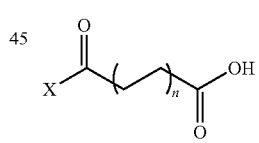

Formula (IV)

wherein X is a halogen (preferably chlorine) and n is an integer from 1 to 20, preferably 2 to 10. Representative species include: 4-(chlorocarbonyl) butanoic acid, 5-(chlorocarbonyl) pentanoic acid, 6-(chlorocarbonyl) hexanoic acid, 7-(chlorocarbonyl) heptanoic acid, 8-(chlorocarbonyl) octanoic acid, 9-(chlorocarbonyl) nonanoic acid, 10-(chlorocarbonyl) decanoic acid, 11-chloro-11-oxoundecanoic acid, 12-chloro-12-oxododecanoic acid, 3-(chlorocarbonyl) cyclobutanecarboxylic acid, 3-(chlorocarbonyl)cyclopentane carboxylic acid, 2,4-bis(chlorocarbonyl)cyclopentane carboxylic acid, 3,5-bis(chlorocarbonyl) cyclohexanecarboxylic acid, and 4-(chlorocarbonyl) cyclohexanecarboxylic acid. While the acyl halide and carboxylic acid groups are shown in terminal positions, one or both may be located at alternative positions along the aliphatic chain. While not shown in Formula (IV), the acid-containing monomer may include additional carboxylic acid and acyl halide groups.

Representative examples of acid-containing monomers include at least one anhydride group and at least one carboxylic acid groups include: 3,5-bis(((butoxycarbonyl)oxy)carbonyl)benzoic acid, 1,3-dioxo-1,3-dihydroisobenzofuran-5-carboxylic acid, 3-(((butoxycarbonyl)oxy)carbonyl)benzoic acid, and 4-(((butoxycarbonyl)oxy)carbonyl)benzoic acid.

The upper concentration range of acid-containing monomer may be limited by its solubility within the non-polar solution and may be dependent upon the concentration of the tri-hydrocarbyl phosphate compound, i.e. the tri-hydrocarbyl phosphate compound is believed to serve as a solubilizer for the acid-containing monomer within the non-polar solvent. In most embodiments, the upper concentration limit is less than 1 wt %. In one set of embodiments, the acid-containing monomer is provided in the non-polar solution at concentration of at least 0.01 wt %, 0.02 wt %, 0.03 wt %, 0.04 wt %, 0.05 wt %, 0.06 wt %, 0.07 wt %, 0.08 wt %, 0.1 wt % or even 0.13 wt % while remaining soluble in solution. In another set of embodiments, the non-polar solution comprises from 0.01 to 1 wt %, 0.02 to 1 wt %, 0.04 to 1 wt % or 0.05 to 1 wt % of the acid-containing monomer. The inclusion of the acid-containing monomer during interfacial polymerization between the polyfunctional amine and acyl halide monomers results in a membrane having improved performance. And, unlike post hydrolysis reactions that may occur on the surface of the thin-film polyamide layer, the inclusion of the acid-containing monomer during interfacial polymerization is believed to result in a polymer structure that is beneficially modified throughout the thin-film layer.

Once brought into contact with one another, the polyfunctional acyl halide and polyfunctional amine monomers react at their surface interface to form a polyamide layer or film. This layer, often referred to as a polyamide "discriminating layer" or "thin film layer," provides the composite membrane with its principal means for separating solute (e.g. salts) from solvent (e.g. aqueous feed). The reaction time of the polyfunctional acyl halide and the polyfunctional amine monomer may be less than one second but contact times typically range from about 1 to 60 seconds. The removal of the excess solvent can be achieved by rinsing the membrane with water and then drying at elevated temperatures, e.g. from about 40° C. to about 120° C., although air drying at ambient temperatures may be used. However, for purposes of the present invention, the membrane is preferably not permitted to dry and is simply rinsed with or dipped in water and optionally stored in a wet state.

The polyamide layer is subsequently treated with a dihydroxyaryl compound as represented by Formula V.

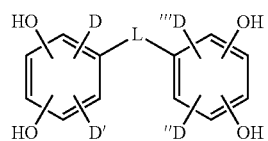

Formula (V)

wherein D, D', D" and D''' are independently selected from: alkyl, alkoxy, hydrogen, halogen, hydroxyl and amine (preferably all are hydrogen), L is a linking group, and the hydroxyl groups are located meta, ortho or para (preferably meta) to each other on both rings. The selection of linking group is not particularly limited but the resulting dihydroxyaryl compound preferably has a mass of 24 to 1000 AMU (more preferably 75 to 1000 AMU). In a preferred embodiment, the dihydroxyaryl compound has a solubility of 50 to 5000 ppm (more preferably 50-750 ppm) in pure water at 25° C. and pH 10. In another embodiment, L is selected from at least one of: amide, amine, azo, ether, ester, aliphatic and arylene. Aliphatic and arylene groups may be unsubstituted or substituted, e.g. substituted with alkyl groups, hydroxyl groups, amine groups, carboxylic acid groups etc. In yet another embodiment, L satisfies all the preceding criteria.

A preferred class of dihydroxyaryl compounds is represented by Formula VI.

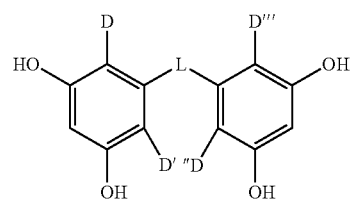

Formula (VI)

In another class of embodiments are represented by Formula VII.

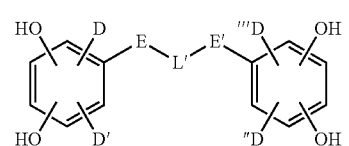

Formula (VII)

wherein E and E' are independently selected from: amide, amine, azo, ether and ester (preferably amide or ether), and L' is selected from at least one of: aliphatic and arylene groups which may be unsubstituted or substituted, e.g. substituted with alkyl groups, hydroxyl groups, amine groups, carboxylic acid groups, etc. Aliphatic groups preferably comprise from 1 to 12 carbon atoms. Arylene groups preferably comprise from 6 to 18 carbon atoms. The hydroxyl groups are preferably located at meta positions to one another on each ring, (i.e. 1,3 position with E and E' located at the 5 position). D, D', D" and D''' are preferably hydrogen. Another set of preferred subclasses are represented by Formulae VIII-X.

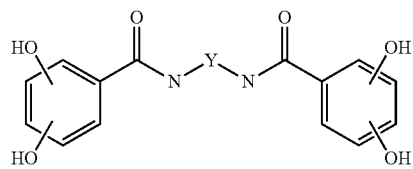

Formula (VIII)

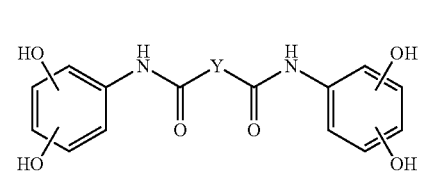

Formula (IX)

-continued

Formula (X)

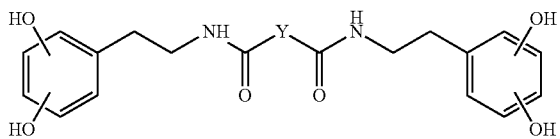

wherein Y is selected from the aliphatic and arylene groups described above. Preferred species are represented by formulae (XI-XIV).

Formula (XI)

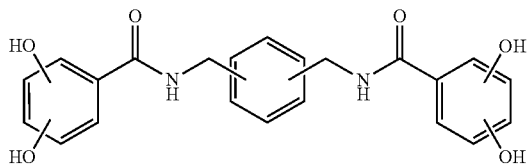

wherein the amide groups are located meta, ortho or para (preferably meta or para) to each other.

Formula (XII)

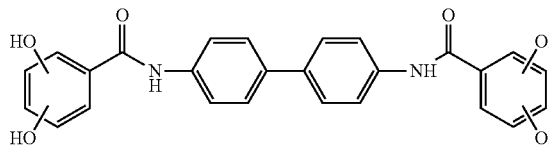

Formula (XIII)

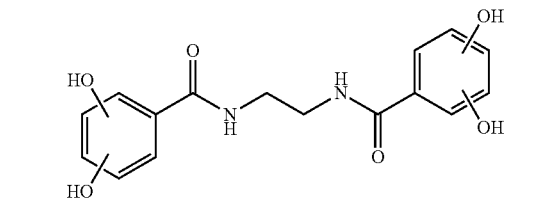

Formula (XIV)

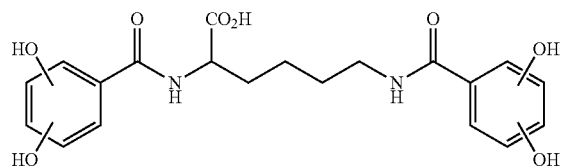

wherein the hydroxyl groups are located meta, ortho or para (preferably meta or para) to each other.

Additional examples include: N,N'-(benzene-1,3-diyldimethanediyl)bis(3,5-dihydroxy benzamide); N,N'-(benzene-1,4-diyldimethanediyl)bis(3,5-dihydroxybenzamide); N,N'-[5-(trifluoro methyl)benzene-1,3-diyl]bis(3,5-dihydroxybenzamide); N,N'-biphenyl-4,4'-diylbis(3,5-dihydroxy benzamide); N,N'-ethane-1,2-diylbis(3,5-dihydroxybenzamide); 3,5-bis[(3,5-dihydroxybenzoyl) amino]benzoic acid; ,5-bis{[(3,5-dihydroxybenzoyl)amino]methyl}benzoic acid; 3,5-bis{[(3,5-di hydroxbenzoyl) amino] methyl}benzenesulfonic acid; 3,5-bis[(3,5-dihydroxybenzoyl) amino] benzene sulfonic acid; N,N'-biphenyl-2,2'-diylbis(3,5-dihydroxybenzamide); N,N'-(5-methoxy benzene-1,3-diyl)bis(3,5-dihydroxybenzamide); N,N'-(5-nitrobenzene-1,3-diyl)bis(3,5-dihydroxy benzamide); 5,5'-[(2-hydroxypropane-1,3-diyl)bis(oxy)]dibenzene-1,3-diol; 1,1'-(4-methylbenzene-1,3-diyl)bis[3-(3,5-dihydroxyphenyl) urea]; ethane-1,2-diyl bis(3,5-dihydroxy benzoate); N,N'-bis (3,5-dihydroxy phenyl) benzene-1,3-dicarboxamide; $N^2,N^6$-bis(3,5-dihydroxybenzoyl)lysine; and 5,5'-[(2,7-dihydroxy octane-1,8-diyl)bis(oxy)]dibenzene-1,3-diol.

The subject dihydroxyaryl compounds may be synthesized using conventional techniques. Several representative examples are provided below:

Example Preparation 1

N,N'-(benzene-1,3-diyldimethanediyl)bis(3,5-dihydroxybenzamide)

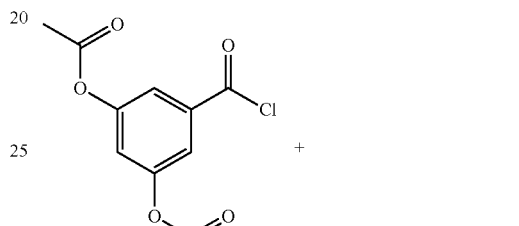

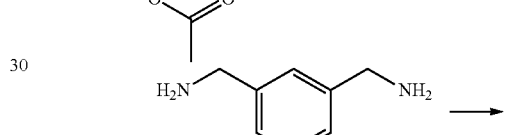

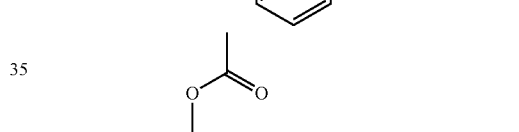

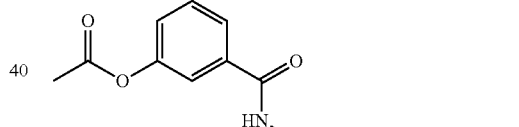

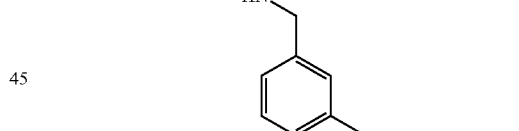

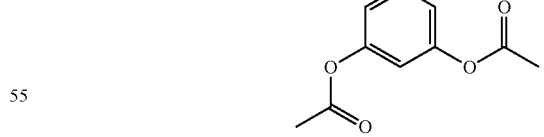

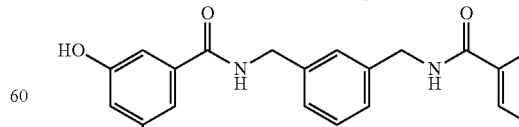

Preparation of benzene-1,3-diylbis(methanediylcarbamoylbenzene-5,1,3-triyl) tetraacetate: A 250 mL round bottom flask was charged with m-xylylene diamine (1.00 g; 7.34 mmol) and dichloromethane (25 mL). To this mixture was added 40 mL sodium bicarbonate solution and the reaction mixture was cooled in an ice bath to 0° C. In a separate 30 mL vial, 5-(chlorocarbonyl)-1,3-phenylene diacetate (2.83 g; 11.0 mmol) was dissolved in 25 mL dichloromethane. The 5-(chlorocarbonyl)-1,3-phenylene diacetate solution was added to the stirring reaction mixture, and the ice bath was removed and the entire mixture was allowed to warm to 25° C. The reaction mixture was stirred for 2 h, and then was acidified by the drop wise addition of HCl until the pH=1. Bubbles of $CO_2$ were observed during the addition of HCl. The organic layer was separated, dried with $MgSO_4$ and the mixture was filtered through a syringe filter. The volatiles were removed by vacuum. Benzene-1,3-diylbis(methanediylcarbamoylbenzene-5,1,3-triyl) tetraacetate was collected as a white powder (2.13 g; 67% yield). $^1$H NMR (400 MHz, $CDCl_3$) δ 7.38 (d, J=2.1 Hz, 4H), 7.28-7.26 (m, 1H), 7.23-7.18 (m, 3H), 7.04 (t, J=2.1 Hz, 2H), 6.89 (t, J=5.7 Hz, 2H), 4.50 (d, J=5.8 Hz, 4H), 2.25 (s, 12H).

Preparation of N,N'-(benzene-1,3-diyldimethanediyl)bis (3,5-dihydroxybenzamide): To a 2 L round-bottom flask was charged benzene-1,3-diylbis(methanediylcarbamoylbenzene-5,1,3-triyl) tetraacetate (15.0 g; 0.0261 mol) and methanol (250 mL). To the stirring reaction mixture was added potassium carbonate (14.4 g; 0.104 mol). The heterogeneous reaction mixture was stirred for 2 h at 25° C., and the mixture turned a light yellow color and became homogeneous. To the reaction mixture was added 400 mL of ethyl acetate and 400 mL water. The reaction mixture was acidified with HCl (20 mL) until the pH=1. The yellow color was observed to move to the organic layer, which was extracted, washed with 250 mL brine, and dried with $MgSO_4$. The mixture was filtered through glass filter frit, and the volatiles were removed by vacuum. N,N'-(benzene-1,3-diyldimethanediyl)bis(3,5-dihydroxybenzamide) was collected as a white solid (9.26 g; 87% yield). $^1$H NMR (400 MHz, DMSO-$d_6$) δ 9.42 (s, 4H), 8.80 (t, J=6.0 Hz, 2H), 7.28-7.13 (m, 4H), 6.71 (d, J=2.2 Hz, 4H), 6.36 (t, J=2.2 Hz, 2H), 4.38 (d, J=6.0 Hz, 4H).

Example Preparation 2

N,N'-(1,4-phenylenebis(methylene))bis(3,5-dihydroxybenzamide)

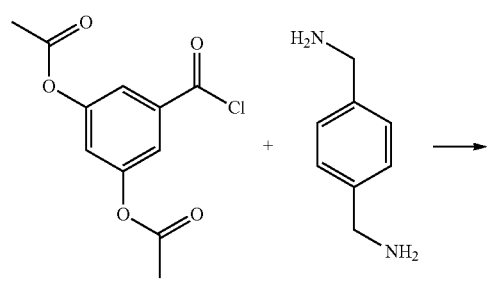

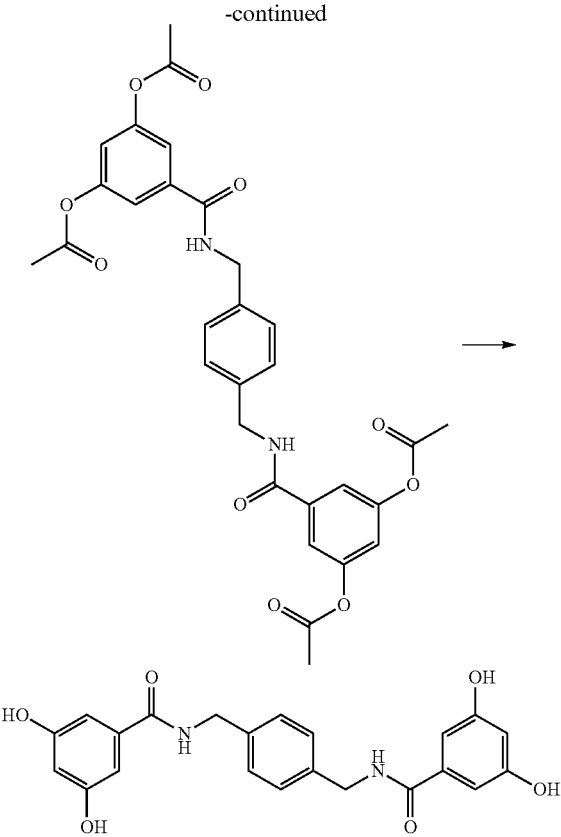

Preparation of benzene-1,4-diylbis(methanediylcarbamoylbenzene-5,1,3-triyl) tetraacetate: A 500 mL round bottom flask was charged with p-xylylenediamine (4.00 g; 29.4 mmol) and dichloromethane (125 mL). To this mixture was added 100 mL sodium bicarbonate solution and the reaction mixture was cooled in an ice bath to 0° C. In a separate 30 mL vial, 5-(chlorocarbonyl)-1,3-phenylene diacetate (12.06 g; 47.0 mmol) was dissolved in 25 mL dichloromethane. The 5-(chlorocarbonyl)-1,3-phenylene diacetate solution was added to the stirring reaction mixture, the ice bath was removed, and the entire mixture was allowed to warm to 25° C. The reaction mixture was stirred for 18 h, and then was acidified by the drop wise addition of HCl until the pH=1. Bubbles of $CO_2$ were observed during the addition of HCl. The organic layer was separated, dried with $MgSO_4$ and the mixture was filtered through a syringe filter. The volatiles were removed by vacuum to reveal 11.4 g of white powder. The product was suspended in 250 mL of ethyl acetate and stirred for 2 h. The slurry was filtered and dried by vacuum. benzene-1,4-diylbis(methanediylcarbamoylbenzene-5,1,3-triyl) tetraacetate was isolated as a white solid (7.45 g; 55%)$^1$H NMR (400 MHz, $CDCl_3$) δ 7.40 (d, J=2.1 Hz, 4H), 7.22 (s, 4H), 7.05 (t, J=2.1 Hz, 2H), 6.69 (t, J=5.6 Hz, 2H), 4.52 (d, J=5.7 Hz, 4H), 2.27 (s, 12H).

Preparation of N,N'-(benzene-1,4-diyldimethanediyl)bis (3,5-dihydroxybenzamide): To a 2 L round-bottom flask was charged benzene-1,4-diylbis(methanediylcarbamoylbenzene-5,1,3-triyl) tetraacetate (6.45 g; 0.0112 mol) and methanol (200 mL). To the stirring reaction mixture was added potassium carbonate (6.19 g; 0.104 mol). The heterogeneous reaction mixture was stirred for 2 h at 25° C., and the mixture turned a light yellow color and became homogeneous. To the reaction mixture was added 600 mL of ethyl acetate and 300 mL water. The reaction mixture was acidified with HCl (20 mL) until the pH=1. The yellow color was observed to move to the organic layer, which was extracted, and dried with MgSO$_4$. The mixture filtered through glass filter frit, and the volatiles were removed by vacuum. N,N'-(benzene-1,4-diyldimethanediyl)bis(3,5-dihydroxybenzamide) was collected as a white solid (4.80 g) that contained 10% water, thus 94% yield of the desired product. $^1$H NMR (400 MHz, DMSO-d$_6$) δ 9.38 (bs, 4H), 8.78 (t, J=6.0 Hz, 2H), 7.23 (s, 4H), 6.70 (d, J=2.2 Hz, 4H), 6.38 (t, J=2.2 Hz, 2H), 4.38 (d, J=6.0 Hz, 4H).

Example Preparation 3

N,N'-[5-(trifluoromethyl)benzene-1,3-diyl]bis(3,5-dihydroxybenzamide)

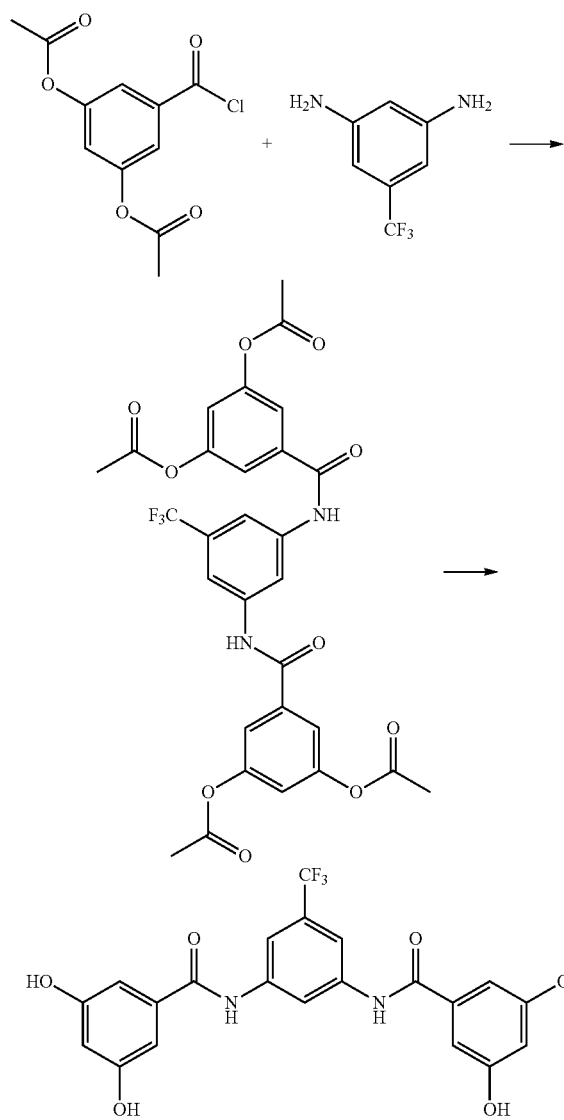

Preparation of [5-(trifluoromethyl)benzene-1,3-diyl]bis(carbamoylbenzene-5,1,3-triyl) tetraacetate: To a 500 mL round bottom flask was added 5-(chlorocarbonyl)-1,3-phenylene diacetate (8.74 g; 34.1 mmol) and 200 mL dichloromethane. To this mixture was added 85 g sodium bicarbonate solution. To the stirring mixture was added 5-(trifluoromethyl) benzene-1,3-diamine (4.00 g; 22.7 mmol). The reaction mixture was stirred overnight (18 h) at 25° C. HCl (15 mL) was added to acidify the mixture (pH=1). The product was extracted by separating the organic phase and drying with MgSO$_4$. The mixture was filtered through a glass filter frit and the volatiles were removed by vacuum. The isolated brown powder contained 16% starting acid chloride by $^1$H NMR. The brown powder was dissolved into 200 mL dichloromethane and 100 mL sodium bicarbonate was added to the mixture. To this mixture was added 5-(trifluoromethyl) benzene-1,3-diamine (0.5 g) and 5-(chlorocarbonyl)-1,3-phenylene diacetate (2.0 g). The reaction mixture was stirred 3 h at 25° C. The mixture was acidified with HCl, and the organic layer was isolated and dried with MgSO$_4$. The mixture was filtered through a glass filter frit and concentrated by vacuum. $^1$H and $^{19}$F NMR spectroscopy of this brown powder showed a small amount of impurity that did not contain fluorine. The crude product was purified by flash chromatography (ethyl acetate/hexane). The purified product was dried overnight by vacuum. [5-(trifluoromethyl)benzene-1,3-diyl]bis(carbamoylbenzene-5,1,3-triyl) tetraacetate was collected as a light tan solid (8.02 g; yield 62%). This material contained 5% ethyl acetate by weight. $^1$H NMR (400 MHz, CDCl$_3$) δ 8.71 (s, 2H), 8.21 (s, 1H), 7.50 (d, J=1.3 Hz, 2H), 7.33 (d, J=2.1 Hz, 4H), 7.01 (t, J=2.1 Hz, 2H), 2.20 (d, J=6.7 Hz, 12H). $^{19}$F NMR (376 MHz, CDCl$_3$) δ −62.86.

Preparation of N,N'-[5-(trifluoromethyl)benzene-1,3-diyl]bis(3,5-dihydroxybenzamide): A 500 mL round-bottom flask was charged with potassium carbonate (7.20 g; 52.0 mmol) and methanol (150 mL). To the stirring reaction mixture was added [5-(trifluoromethyl)benzene-1,3-diyl]bis (carbamoylbenzene-5,1,3-triyl) tetraacetate (8.02 g; 13.0 mmol). The heterogeneous reaction mixture was stirred for 3 h at 25° C. The reaction mixture turned a light yellow color and became homogeneous. To the reaction mixture was added 400 mL of ethyl acetate and 100 mL water, and the mixture was acidified with HCl (13 mL) until the pH=1. The yellow color was observed to move to the organic layer. The organic layer was separated, dried with MgSO$_4$, and filtered through a glass filter frit. The volatiles were removed by vacuum. N,N'-[5-(trifluoro methyl)benzene-1,3-diyl]bis(3,5-dihydroxybenzamide) was isolated as an off-white solid (5.59 g; 96%). $^1$H NMR (400 MHz, DMSO) δ 10.41 (s, 2H), 9.61 (s, 4H), 8.59 (s, 1H), 7.90 (d, J=1.4 Hz, 2H), 6.82 (d, J=2.2 Hz, 4H), 6.46 (t, J=2.2 Hz, 2H). $^{19}$F NMR (376 MHz, DMSO) δ −61.

Example Preparation 4

N,N'-biphenyl-4,4'-diylbis(3,5-dihydroxybenzamide)

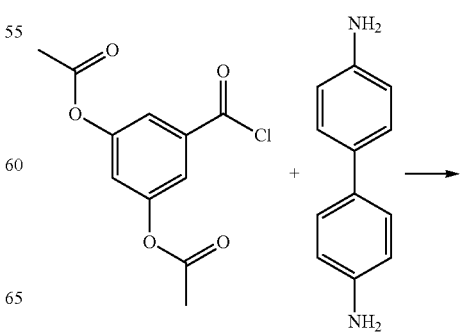

15
-continued

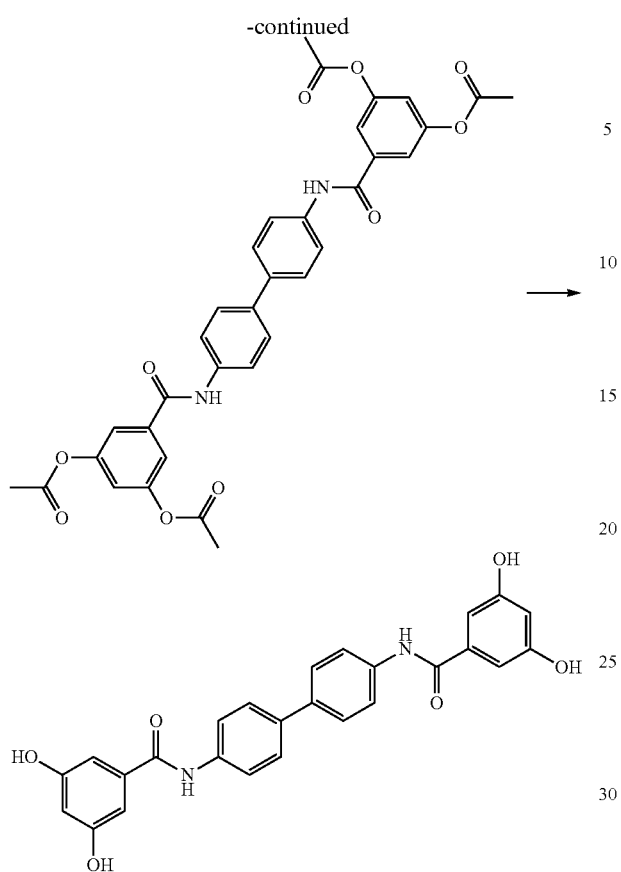

Preparation of biphenyl-4,4'-diylbis(carbamoylbenzene-5,1,3-triyl) tetraacetate: To a 500 mL round bottom flask was added benzidine (5.00 g; 27.1 mmol) and 5-(chlorocarbonyl)-1,3-phenylene diacetate (13.9 g; 54.3 mmol). To this mixture was added 200 mL dichloromethane and sodium bicarbonate (100 g). The reaction mixture was stirred overnight at 25° C. and a grey precipitate formed. The reaction mixture was acidified with HCl until the pH=1. The grey precipitate was collected by filtration. The precipitate was washed with a small amount dichloro-methane (20 mL) and water (100 mL). The grey solid was dried overnight by vacuum. biphenyl-4,4'-diylbis(carbamoylbenzene-5,1,3-triyl) tetraacetate was isolated as grey solid (17.0 g) that contains approx. 20% water (yield=80%). $^1$H NMR (400 MHz, DMSO) δ 10.44 (s, 2H), 7.87 (d, J=8.7 Hz, 4H), 7.73-7.68 (m, 8H), 7.29 (t, J=2.1 Hz, 2H), 3.40 (s, 24H), 2.33 (s, 12H).

Preparation of N,N'-biphenyl-4,4'-diylbis(3,5-dihydroxybenzamide): A 500 mL round-bottom flask was charged with potassium carbonate (12.30 g; 89.2 mmol) and methanol (150 mL). To the stirring reaction mixture was added biphenyl-4,4'-diylbis(carbamoylbenzene-5,1,3-triyl) tetraacetate (13.93 g; 22.3 mmol). The heterogeneous reaction mixture was stirred for 3 h at 25° C. To the reaction mixture was added 400 mL of ethyl acetate and 100 mL of water. The reaction mixture was acidified with HCl (15 mL) until the pH=1. Clean separation of the organic and aqueous layers was not observed. The organic layer was separated, dried with MgSO$_4$, and filtered through a glass filter frit. The volatiles were removed by vacuum but only ~1.5 g of orange solid was collected. The volatiles were then removed from the aqueous layer to reveal a light brown solid. The solid was suspended in 100 mL water, and collected by filtration. The solid was washed with water and dried by vacuum for 3 days. N,N'-biphenyl-4,4'-diylbis(3,5-dihydroxybenzamide) was isolated as a light brown solid (5.89 g; 72%). $^1$H NMR (400 MHz, DMSO) δ 10.16 (s, 2H), 9.57 (s, 4H), 7.86 (d, J=8.8 Hz, 4H), 7.65 (d, J=8.8 Hz, 4H), 6.81 (d, J=2.2 Hz, 4H), 6.44 (t, J=2.1 Hz, 2H).

Example Preparation 5

N,N'-ethane-1,2-diylbis(3,5-dihydroxybenzamide)

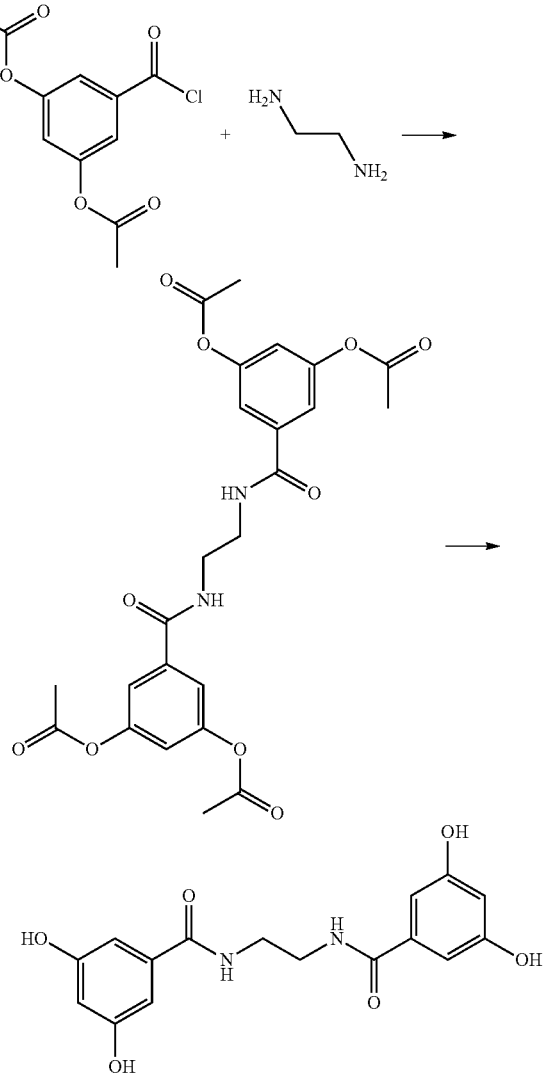

Preparation of ethane-1,2-diylbis(carbamoylbenzene-5,1,3-triyl) tetraacetate: To a 1 L round bottom flask was added 5-(chlorocarbonyl)-1,3-phenylene diacetate (15.35 g; 79.1 mmol), which was dissolved in 250 mL dichloromethane. The reaction mixture was added 100 mL of sodium bicarbonate. Ethylene diamine (3.17 g; 52.7 mmol) was added drop wise to the reaction mixture via a gas tight syringe. The reaction mixture stirred for 3 h at 25° C. HCl (25 mL) was added to acidify the reaction mixture to pH=1. The organic phase was separated, washed with brine, and dried with MgSO$_4$. The volatiles were removed by vacuum to reveal the product as a white solid. To remove soluble impurities, the solid was suspended in 100 mL ethyl acetate and the mixture was stirred for 1 h. The slurry was filtered and the product washed with ethyl acetate and dried by vacuum overnight. ethane-1,2-diylbis(carbamoylbenzene-5,1,3-triyl) tetraacetate was isolated as a white solid (7.47 g; 99%). $^1$H NMR (400 MHz, CDCl$_3$) δ 7.42 (d, J=2.1 Hz, 4H), 7.40 (s, 2H), 7.04 (t, J=2.1 Hz, 2H), 3.57 (bs, 4H), 2.27 (s, 12H).

Preparation of N,N'-ethane-1,2-diylbis(3,5-dihydroxybenzamide): To a 250 mL round bottom flask was added ethane-1,2-diylbis(carbamoylbenzene-5,1,3-triyl) tetraacetate (5.37 g; 10.7 mmol), which was dissolved into 100 mL methanol. To this mixture was added potassium carbonate (5.25 g; 42.9 mmol). The reaction mixture was stirred at 25° C. for 4 h. The pH of the mixture was adjusted to pH=5 by the addition of 1M HCl (65 mL). The volatiles were removed by vacuum leaving a white solid residue. To the residue was added 45 mL of water, and the mixture was stirred for 1 h. The solid product was isolated by filtration to collect 5.3 g of wet product. The wet cake was dried overnight. N,N'-ethane-1,2-diylbis(3,5-dihydroxybenzamide) was isolated as white solid (3.97 g) that contained 29% water. (Yield=85%). This yield corresponds to the product containing 29% water (by $^1$H NMR spectroscopy). $^1$H NMR (400 MHz, DMSO) δ 9.44 (s, 4H), 8.30 (s, 2H), 6.67 (d, J=2.1 Hz, 4H), 6.35 (t, J=2.0 Hz, 2H), 3.34 (s, 4+17H).

Example Preparation 6

3,5-bis[(3,5-dihydroxybenzoyl)amino]benzoic acid

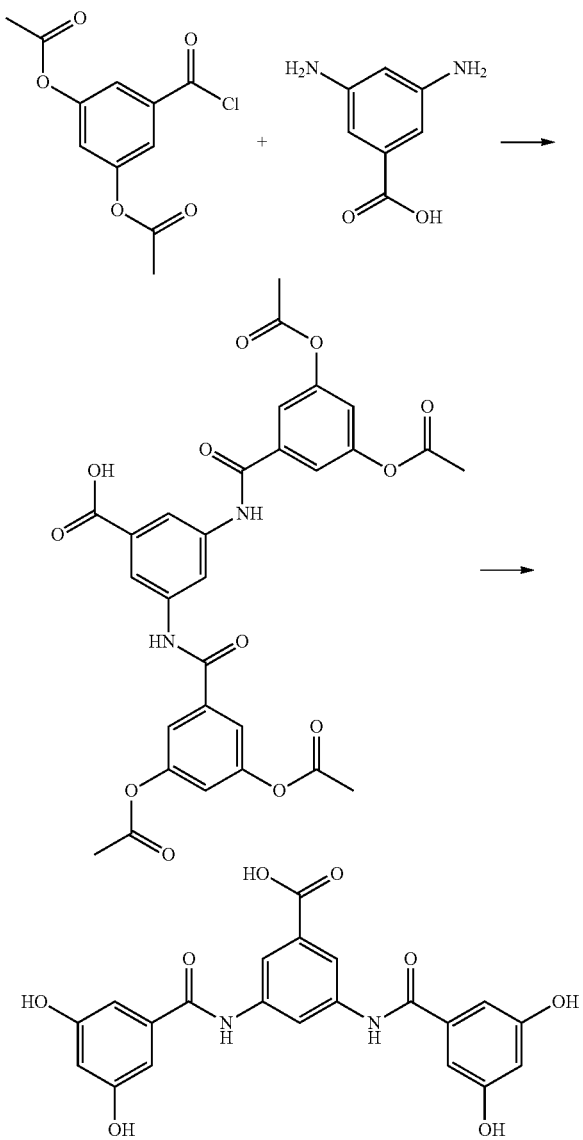

Preparation of 3,5-bis({[3,5-bis(acetyloxy)benzoyl]amino}methyl)benzoic acid: To a 1 L round bottom flask was added 5-(chlorocarbonyl)-1,3-phenylene diacetate (15.96 g), 200 mL THF, and sodium bicarbonate (100 g). To the stirring reaction mixture was added 3,5-diaminobenzoic acid dihydrochloride (7.01 g) portion wise. After each addition of 3,5-diaminobenzoic acid dihydrochloride, $CO_2$ bubbles were observed. The reaction mixture was stirred for 4 h, and then acidified with HCl (15 mL). To the mixture was added EtOAc (300 mL). The organic layer was extracted and dried over $MgSO_4$. The volatiles were removed by vacuum to reveal off-white powder. $^1$H NMR shows primarily a single product and some unreacted 5-(chlorocarbonyl)-1,3-phenylene diacetate. The solid was suspended in 150 mL of ethyl acetate and stirred for 1 h. The solid was collected triturated with ethyl acetate (150 mL) and collected by filtration twice. The isolated solid was dried by vacuum. 3,5-bis({[3,5-bis(acetyloxy)benzoyl]amino}methyl)benzoic acid was isolated as a white solid (7.09 g; 38% yield). $^1$H NMR (400 MHz, DMSO) δ 10.56 (s, 2H), 8.65 (s, 1H), 8.15 (d, J=2.0 Hz, 2H), 7.71 (d, J=2.1 Hz, 4H), 7.29 (t, J=2.1 Hz, 2H), 2.32 (s, 12H). NOTE: The resonance corresponding to the carboxylic acid proton was not observed.

Preparation of 3,5-bis[(3,5-dihydroxybenzoyl)amino]benzoic acid: A 500 mL round-bottom flask was charged with potassium carbonate (6.50 g; 47.2 mmol) and methanol (100 mL). To the stirring reaction mixture was added 3,5-bis({[3,5-bis(acetyloxy)benzoyl]amino}methyl)benzoic acid (6.99 g; 11.8 mmol). The heterogeneous reaction mixture was stirred for 3 h at 25° C. To the reaction mixture was added 400 mL of ethyl acetate and 100 mL of water. The reaction mixture was acidified with HCl (15 mL) until the pH=1. The organic layer was extracted, dried with $MgSO_4$, and the volatiles were removed by vacuum. Isolated 5.87 g of light pink solid that was contaminated with salts. Suspended the solid in 100 mL water, and collected by filtration. The solid was dried overnight by vacuum. 3,5-bis[(3,5-dihydroxybenzoyl)amino]benzoic acid was isolated as a light pink solid (4.45 g; 88%). $^1$H NMR (400 MHz, DMSO) δ 10.28 (s, 2H), 9.57 (s, 4H), 8.53 (t, J=2.0 Hz, 1H), 8.11 (d, J=2.0 Hz, 2H), 6.82 (d, J=2.2 Hz, 4H), 6.78 (d, J=2.2 Hz, 1H), 6.44 (t, J=2.2 Hz, 2H). NOTE: The resonance corresponding to the carboxylic acid proton was not observed.

The method of treating the polyamide layer with the subject dihydroxyaryl compounds is not particularly limited and includes applying the dihydroxyaryl compound (e.g. 10-20000 ppm) from an aqueous solution with a pH range of 3-11, which may further include 1-20 wt % alcohol such as methanol, isopropanol and polar aprotic solvents such as DMSO, DMF, DMAc, NMP, etc, such that the compound remains predominately on the outer surface (surface opposite to that contacting the porous support) of the polyamide layer, or soaking the polyamide layer in a dip tank containing the dihydroxyaryl compound such that the polyamide layer becomes impregnated with the compound. The dihydroxyaryl compound is applied to the polyamide layer in combination with the step of exposing the polyamide layer to nitrous acid, (e.g. the dihydroxyaryl compound may be applied to the polyamide layer before, during or after exposure to nitrous acid, but preferably before).

A variety of applicable techniques for exposing the polyamide layer to nitrous acid are described in U.S. Pat. No. 4,888,116 and are incorporated herein by reference. It is believed that the nitrous acid reacts with the residual primary amine groups present in the polyamide discrimination layer to form diazonium salt groups, a portion of which react with the dihydroxy-substituted aromatic rings of the subject dihydroxyaryl compounds and residual unreacted amines in the polyamide layer to form azo groups, i.e. form crosslinks in the polyamide structure.

In one embodiment, an aqueous solution of nitrous acid is applied to the thin film polyamide layer. Although the aqueous solution may include nitrous acid, it preferably includes reagents that form nitrous acid in situ, e.g. an alkali metal nitrite in an acid solution or nitrosyl sulfuric acid. Because nitrous acid is volatile and subject to decomposition, it is preferably formed by reaction of an alkali metal nitrite in an acidic solution in contact with the polyamide discriminating layer. Generally, if the pH of the aqueous solution is less than about 7, (preferably less than about 5), an alkali metal nitrite will react to liberate nitrous acid. Sodium nitrite reacted with hydrochloric or sulfuric acid in an aqueous solution is especially preferred for formation of nitrous acid. The aqueous solution may further include wetting agents or surfactants. The concentration of the nitrous acid in the aqueous solution is preferably from 0.01 to 1 wt %. Generally, the nitrous acid is more soluble at 5° than at 20° C. and somewhat higher concentrations of nitrous acid are operable at lower temperatures. Higher concentrations are operable so long as the membrane is not deleteriously affected and the solutions can be handled safely. In general, concentrations of nitrous acid higher than about one-half (0.5) percent are not preferred because of difficulties in handling these solutions. Preferably, the nitrous acid is present at a concentration of about 0.1 weight percent or less because of its limited solubility at atmospheric pressure. The temperature at which the membrane is contacted can vary over a wide range. Inasmuch as the nitrous acid is not particularly stable, it is generally desirable to use contact temperatures in the range from about 0° to about 30° C., with temperatures in the range from 0° to about 20° C. being preferred. Temperatures higher than this range can increase the need for ventilation or super-atmospheric pressure above the treating solution. Temperatures below the preferred range generally result in reduced reaction and diffusion rates.

One preferred application technique involves passing the aqueous nitrous acid solution over the surface of the membrane in a continuous stream. This allows the use of relatively low concentrations of nitrous acid. When the nitrous acid is depleted from the treating medium, it can be replenished and the medium recycled to the membrane surface for additional treatment. Batch treatments are also operable. The specific technique for applying aqueous nitrous acid is not particularly limited and includes spraying, film coating, rolling, or through the use of a dip tank among other application techniques. Once treated the membrane may be washed with water and stored either wet or dry prior to use.

The reaction between the nitrous acid and the primary amine groups of the polyamide layer occurs relatively quickly once the nitrous acid has diffused into the membrane. The time required for diffusion and the desired reaction to occur will depend upon the concentration of nitrous acid, any pre-wetting of the membrane, the concentration of primary amine groups present, the 3 dimensional structure of the membrane and the temperature at which contact occurs. Contact times may vary from a few minutes to a few days. The optimum reaction time can be readily determined empirically for a particular membrane and treatment. The dihydroxyaryl compound is added to the membrane as a basic aqueous solution either prior to treatment with nitrous acid or immediately following the addition of nitrous acid. After the residual amine moieties have been converted to the diazonium salts, the pH is raised to 9 and the temperature is increased to 25° C. to initiate the diazo coupling. The nucleophilic dihydroxyaryl group reacts with the diazonium salt to form a new C—N bond via a diazo linkage. The dihydroxyaryl compounds are sufficiently more reactive than simple phenols formed from hydrolysis of the diazonium salts, and are therefore incorporated into the membrane. In a preferred embodiment, the size of the dihydroxyaryl compound isolates its coupling to the surface of the membrane, i.e. because it is too large to diffuse into the polyamide layer. The dihydroxyaryl compounds are bifunctional, (i.e. contain at least two dihydroxyaryl groups), and can therefore form crosslinks on the surface of the membrane.

The thin film polyamide layer may optionally include hygroscopic polymers upon at least a portion of its surface. Such polymers include polymeric surfactants, polyacrylic acid, polyvinyl acetate, polyalkylene oxide compounds, poly(oxazoline) compounds, polyacrylamides and related reaction products as generally described in U.S. Pat. No. 6,280,853; U.S. Pat. No. 7,815,987; U.S. Pat. No. 7,918,349 and U.S. Pat. No. 7,905,361. In some embodiments, such polymers may be blended and/or reacted and may be coated or otherwise applied to the polyamide membrane from a common solution, or applied sequentially.

Many embodiments of the invention have been described and in some instances certain embodiments, selections, ranges, constituents, or other features have been characterized as being "preferred." Characterizations of "preferred" features should in no way be interpreted as deeming such features as being required, essential or critical to the invention.

EXAMPLES

Sample membranes were prepared using a pilot scale membrane manufacturing line. Polysulfone supports were cast from 16.5 wt % solutions in dimethylformamide (DMF) and subsequently soaked in an aqueous solution metaphenylene diamine (mPD). The resulting support was then pulled through a reaction table at constant speed while a thin, uniform layer of a non-polar coating solution was applied. The non-polar coating solution included a isoparaffinic solvent (ISOPAR L) and a combination of trimesoyl acid chloride (TMC) with or without 1-carboxy-3,5-dichloroformyl benzene (mhTMC) and tri butyl phosphate (TBP). Excess non-polar solution was removed and the resulting composite membrane was passed through water rinse tanks and drying ovens. Sample membrane sheets were then either (i) stored in pH 9 deionized water until testing; or (ii) soaked for approximately 15 minutes in a solution at 0-10° C. prepared by combining 0.05% w/v NaNO$_2$ and 0.1 w/v % HCl and thereafter rinsed and stored in pH 9 deionized water until testing or (iii) first impregnated with solutions of 500 ppm of dihydroxyaryl compounds "DHA" at pH 10-11 for 15 minutes and then soaked for approximately 15 minutes in a solution at 0-10° C. prepared by combining 0.05% w/v NaNO$_2$ and 0.1 w/v % HCl and thereafter rinsed and stored in pH 9 deionized water at 25° C. until testing. DHA-1 was N,N'-(benzene-1,3-diyldimethanediyl)bis(3,5-dihydroxy benzamide), DHA-2 was N,N'-(benzene-1,4-diyldimethanediyl)bis(3,5-dihydroxy benzamide), DHA-3 was N,N'-[5-(trifluoromethyl)benzene-1,3-diyl]bis(3,5-dihydroxybenz amide), DHA-4 was N,N'-biphenyl-4,4'-diylbis(3,5-dihydroxybenzamide), DHA-5 was N,N'-ethane-1,2-diylbis(3,5-dihydroxy benzamide), DHA-6 was 3,5-bis[(3,5-dihydroxybenzoyl)amino]benzoic acid. Testing was conducted with an aqueous mixture of 2000 ppm NaCl and 5 ppm boron solution at 25° C., pH 8 and 150 psi.

Table 1-1 shows the flux and NaCl passage data and table 1-2 shows the boron passage data of DHA-1 and DHA-2 compounds. Table 2 shows the flux and NaCl passage data of DHA-3 and DHA-5. Table 3 shows the flux and NaCl passage data of DHA-4 and DHA-6.

TABLE 1-1

| Sample | Mean (Avg Flux) GFD | Mean (Avg SP) | Std Dev (Avg Flux) | Std Dev (Avg SP) | Mean (Avg A) (GFD/psi) | Mean (Avg B) (psi) | Std Dev (Avg A) | Std Dev (Avg B) |
|---|---|---|---|---|---|---|---|---|
| Control | 7.9 | 2.77% | 0.71 | 0.23% | 0.06 | 0.23 | 0.005 | 0.040 |
| Post-treated Control | 8.3 | 3.26% | 0.43 | 0.23% | 0.07 | 0.28 | 0.003 | 0.035 |
| Post-treated Control with DHA-1 | 5.2 | 1.41% | 0.99 | 0.37% | 0.04 | 0.07 | 0.008 | 0.016 |
| Post-treated Control with DHA-2 | 4.2 | 1.39% | 0.18 | 0.24% | 0.03 | 0.06 | 0.002 | 0.011 |
| Control w/TBP | 43.9 | 1.82% | 2.79 | 0.32% | 0.35 | 0.81 | 0.022 | 0.093 |
| Post-treated Control with TBP | 50.1 | 2.05% | 3.11 | 0.15% | 0.39 | 1.05 | 0.025 | 0.035 |
| Post-treated Control with TBP & DHA-1 | 31.6 | 0.67% | 4.49 | 0.00% | 0.25 | 0.21 | 0.035 | 0.030 |
| Post-treated Control with TBP & DHA-2 | 26.7 | 0.69% | 3.76 | 0.10% | 0.21 | 0.18 | 0.030 | 0.002 |
| Control with TBP & mh-TMC | 40.1 | 0.76% | 4.22 | 0.05% | 0.32 | 0.31 | 0.033 | 0.014 |
| Post-treated Control with TBP & mh-TMC | 53.5 | 0.99% | 1.13 | 0.07% | 0.42 | 0.54 | 0.009 | 0.050 |
| Post-treated Control w/TBP, mh-TMC & DHA-1 | 37.3 | 0.42% | 1.95 | 0.01% | 0.30 | 0.16 | 0.016 | 0.008 |
| Post-treated Control w/TBP, mh-TMC & DHA-2 | 35.3 | 0.38% | 0.98 | 0.03% | 0.28 | 0.14 | 0.008 | 0.009 |

TABLE 1-2

| Sample | Mean (Boron SP) | Mean (Boron B) (psi) | Std Dev (Boron SP) | Std Dev (Boron B) |
|---|---|---|---|---|
| Control | 58% | 11.1 | 2.1% | 1.01 |
| Post-treated Control | 63% | 13.9 | 1.1% | 1.22 |
| Post-treated Control with DHA-1 | 44% | 4.4 | 11.0% | 2.37 |
| Post-treated Control with DHA-2 | 46% | 3.6 | 2.1% | 0.44 |
| Control with TBP | 48% | 40.7 | 1.9% | 0.60 |
| Post-treated Control with TBP | 55% | 60.5 | 1.0% | 1.97 |
| Post-treated Control with TBP & DHA-1 | 40% | 20.7 | 0.3% | 2.83 |
| Post-treated Control with TBP & DHA-2 | 41% | 18.6 | 1.1% | 1.77 |
| Control with TBP & mh-TMC | 50% | 39.5 | 1.8% | 1.37 |
| Post-treated Control with TBP & mh-TMC | 55% | 65.8 | 1.6% | 4.36 |
| Post-treated Control w/TBP, mh-TMC & DHA-1 | 41% | 26.2 | 1.0% | 1.74 |
| Post-treated Control w/TBP, mh-TMC & DHA-2 | 47% | 36.6 | 15.0% | 25.28 |

TABLE 2

| Sample | Mean (Avg Flux) GFD | Mean (Avg SP) | Std Dev (Avg Flux) | Std Dev (Avg SP) | Mean (Avg A) (GFD/psi) | Mean (Avg B) (psi) | Std Dev (Avg A) | Std Dev (Avg B) |
|---|---|---|---|---|---|---|---|---|
| Control | 15.5 | 1.47% | 0.12 | 0.23 | 1.20 | 0.07% | 0.009 | 0.020 |
| Post-treated Control | 16.3 | 2.15% | 0.13 | 0.36 | 1.00 | 0.13% | 0.008 | 0.028 |
| Post-treated Control with DHA-3 | 14.2 | 1.50% | 0.11 | 0.22 | 0.65 | 0.09% | 0.005 | 0.022 |
| Post-treated Control with DHA-5 | 12.8 | 1.71% | 0.10 | 0.22 | 0.31 | 0.05% | 0.002 | 0.006 |
| Control w/TBP | 50.6 | 1.41% | 0.40 | 0.72 | 1.49 | 0.05% | 0.012 | 0.045 |
| Post-treated Control with TBP | 65.3 | 2.02% | 0.51 | 1.34 | 1.36 | 0.09% | 0.011 | 0.041 |
| Post-treated Control with TBP & DHA-3 | 50.3 | 1.22% | 0.40 | 0.62 | 2.38 | 0.10% | 0.019 | 0.077 |
| Post-treated Control with TBP & DHA-5 | 49.1 | 1.35% | 0.39 | 0.67 | 1.65 | 0.02% | 0.013 | 0.032 |
| Control with TBP & mh-TMC | 52.6 | 0.68% | 0.42 | 0.36 | 1.65 | 0.03% | 0.013 | 0.023 |

TABLE 2-continued

| Sample | Mean (Avg Flux) GFD | Mean (Avg SP) | Std Dev (Avg Flux) | Std Dev (Avg SP) | Mean (Avg A) (GFD/psi) | Mean (Avg B) (psi) | Std Dev (Avg A) | Std Dev (Avg B) |
|---|---|---|---|---|---|---|---|---|
| Post-treated Control with TBP & mh-TMC | 66.3 | 0.98% | 0.52 | 0.65 | 1.32 | 0.09% | 0.010 | 0.050 |
| Post-treated Control w/ TBP, mh-TMC & DHA-3 | 60.3 | 0.68% | 0.48 | 0.42 | 3.57 | 0.06% | 0.028 | 0.054 |
| Post-treated Control w/ TBP, mh-TMC & DHA-5 | 59.6 | 0.79% | 0.47 | 0.48 | 1.35 | 0.06% | 0.011 | 0.033 |

TABLE 3

| Sample | Mean (Avg Flux) GFD | Mean (Avg SP) | Std Dev (Avg Flux) | Std Dev (Avg SP) | Mean (Avg A) (GFD/psi) | Mean (Avg B) (psi) | Std Dev (Avg A) | Std Dev (Avg B) |
|---|---|---|---|---|---|---|---|---|
| Control | 14.1 | 1.37% | 0.25 | 0.09% | 0.11 | 0.20 | 0.002 | 0.013 |
| Post-treated Control | 14.4 | 1.57% | 0.15 | 0.10% | 0.11 | 0.23 | 0.001 | 0.014 |
| Post-treated Control w/ DHA-4 | 10.0 | 1.30% | 0.20 | 0.03% | 0.08 | 0.13 | 0.001 | 0.002 |
| Post-treated Control w/ DHA-6 | 10.1 | 1.12% | 0.48 | 0.12% | 0.08 | 0.11 | 0.004 | 0.012 |
| Control w/TBP | 51.5 | 1.72% | 1.86 | 0.07% | 0.41 | 0.90 | 0.015 | 0.027 |
| Post-treated Control w/TBP | 58.7 | 2.04% | 2.44 | 0.17% | 0.46 | 1.22 | 0.019 | 0.066 |
| Post-treated Control w/TBP & DHA-4 | 42.0 | 1.36% | 1.93 | 0.13% | 0.33 | 0.58 | 0.015 | 0.069 |
| Post-treated Control w/TBP & DHA-6 | 37.7 | 1.22% | 5.31 | 0.19% | 0.30 | 0.46 | 0.042 | 0.029 |
| Control w/TBP & mh-TMC | 49.8 | 0.68% | 1.30 | 0.06% | 0.39 | 0.34 | 0.010 | 0.029 |
| Post-treated Control w/TBP & mh-TMC | 57.8 | 0.65% | 2.29 | 0.03% | 0.46 | 0.38 | 0.018 | 0.030 |
| Post-treated Control w/TBP, mh-TMC & DHA-4 | 54.7 | 0.58% | 1.37 | 0.07% | 0.43 | 0.32 | 0.011 | 0.040 |
| Post-treated Control w/TBP, mh-TMC & DHA-6 | 50.0 | 0.51% | 0.60 | 0.02% | 0.40 | 0.26 | 0.005 | 0.014 |

The invention claimed is:

1. A method for making a composite polyamide membrane comprising a porous support and a polyamide layer, wherein the method comprises:
   i) applying a polar solution comprising a polyfunctional amine monomer and a non-polar solution comprising a polyfunctional acyl halide monomer to a surface of a porous support and interfacially polymerizing the monomers to form a polyamide layer;
   ii) applying a dihydroxyaryl compound to the polyamide layer, wherein the dihydroxyaryl compound is represented by

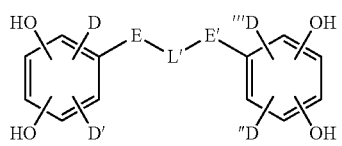

Formula (VII)

wherein D, D', D" and D''' are independently selected from: alkyl, alkoxy, hydrogen, halogen, hydroxyl and amine, E and E' are independently selected from:

amide, amine, azo, ether and ester, and L' is selected from at least one of: aliphatic and arylene, and iii) exposing the thin film polyamide layer to nitrous acid; wherein step ii) is performed before, during or after step iii).

2. The method of claim 1 wherein steps i), ii) and iii) are performed sequentially.

3. The method of claim 1 wherein D, D', D", and D''' are hydrogen.

4. The method of claim 1 wherein E and E' are independently selected from: amide and ether.

5. The method of claim 1 wherein the non-polar solution further comprises an acid-containing monomer comprising a $C_2$-$C_{20}$ hydrocarbon moiety substituted with at least one carboxylic acid functional group or salt thereof and at least one amine-reactive functional group selected from: acyl halide, sulfonyl halide and anhydride, wherein the acid-containing monomer is distinct from the polyfunctional acyl halide monomer.

6. The method of claim 1 wherein the thin film polyamide layer has a dissociated carboxylic acid content of at least 0.18 moles/kg at pH 9.5 as measured by RBS prior to the step of exposing the thin film polyamide layer to nitrous acid.

7. The method of claim 1 wherein at least one of the polar and non-polar solutions further comprises a tri-hydrocarbyl phosphate compound represented by Formula (I):

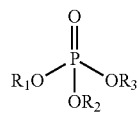

Formula (I)

wherein $R_1$, $R_2$ and $R_3$ are independently selected from hydrogen and hydrocarbyl groups comprising from 1 to 10 carbon atoms, with the proviso that no more than one of $R_1$, $R_2$ and $R_3$ are hydrogen.

8. The method of claim 1 wherein the dihydroxyaryl compound is selected from at least one of:
N,N'-(benzene-1,3-diyldimethanediyl)bis(3,5-dihydroxybenzamide)
N,N'-(1,4-phenylenebis(methylene))bis(3,5-dihydroxybenzamide)
N,N'-[5-(trifluoromethyl)benzene-1,3-diyl]bis(3,5-dihydroxybenzamide)
N,N'-biphenyl-4,4'-diylbis(3,5-dihydroxybenzamide)
N,N'-ethane-1,2-diylbis(3,5-dihydroxybenzamide)
3,5-bis[(3,5-dihydroxybenzoyl)amino]benzoic acid.

9. The method of claim 1 wherein the dihydroxyaryl compound is represented by at least one of:

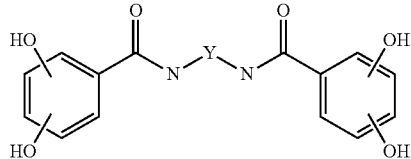

Formula (VIII)

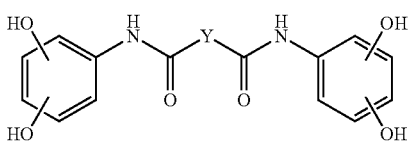

Formula (IX)

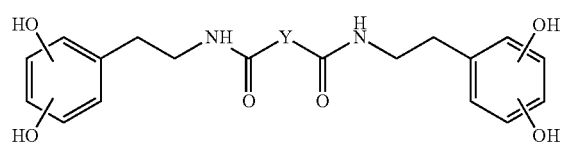

Formula (X)

wherein Y is selected from the aliphatic and arylene.

10. The method of claim 1 wherein the dihydroxyaryl compound is represented by at least one of:

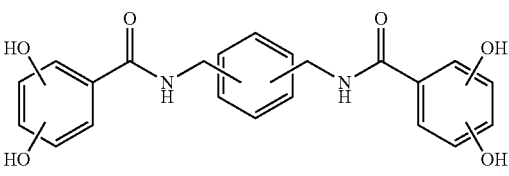

Formula (XI)

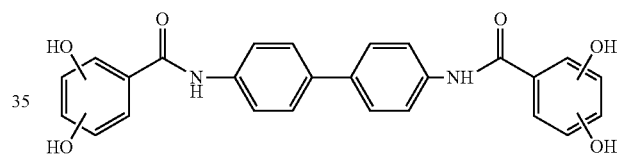

Formula (XII)

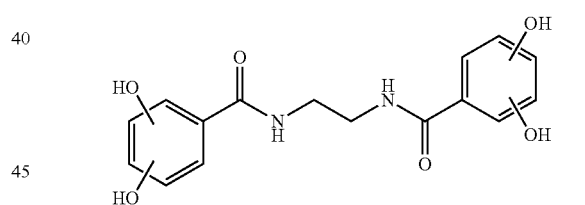

Formula (XIII)

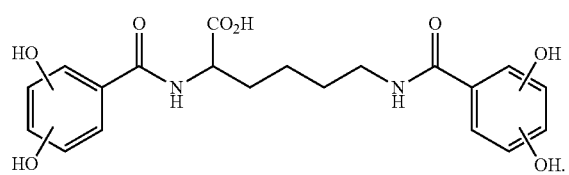

Formula (XIV)

* * * * *